US006768934B2

(12) United States Patent
Sumida et al.

(10) Patent No.: US 6,768,934 B2
(45) Date of Patent: Jul. 27, 2004

(54) VEHICLE-ROADSIDE SERVICE PROVIDING SYSTEM

(75) Inventors: Masato Sumida, Tokyo (JP); Minoru Nishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/422,801

(22) Filed: Apr. 25, 2003

(65) Prior Publication Data

US 2004/0083030 A1 Apr. 29, 2004

(30) Foreign Application Priority Data

Oct. 28, 2002 (JP) ....................................... 2002-312751

(51) Int. Cl.[7] ................................................ G06F 19/00

(52) U.S. Cl. ........................... 701/1; 701/200; 340/905; 340/928

(58) Field of Search ..................... 701/1, 200; 340/928, 340/905, 10.1, 10.3

(56) References Cited

U.S. PATENT DOCUMENTS 6,417,781 B1 * 7/2002 Matsumoto ................. 340/901
6,636,799 B2 * 10/2003 D'Amico et al. ........... 701/200
2002/0014976 A1 * 2/2002 Yoshida ....................... 340/928
2002/0080048 A1 * 6/2002 Choi ........................... 340/988
2003/0105662 A1 * 6/2003 Koketsu et al. ............... 705/13
2003/0132857 A1 * 7/2003 Kawamoto .................. 340/905
2003/0171094 A1 * 9/2003 Kawai ........................ 455/3.01
2004/0019412 A1 * 1/2004 Miyamoto ..................... 701/1

FOREIGN PATENT DOCUMENTS

JP 2001-213286 A 8/2001
JP 2002-015342 A 1/2002

* cited by examiner

*Primary Examiner*—Gary Chin
(74) *Attorney, Agent, or Firm*—Sughrue Mion, PLLC

(57) ABSTRACT

A vehicle-roadside service providing system enables a user to use even a service which is not accommodated by on-board service client equipment installed on a vehicle. A service host equipment (1) stores a service sequence that describes the content of a service. Service client equipment (6) acquires the service sequence from the service host equipment (1) through DSRC equipment (5*a*, 5*b*) at the times of execution of the service. The service sequence is sequentially executed by sequence step executing parts (4, 10) while performing data transmission and reception through communications between the service host equipment (1) and the service client equipment (6) based on the service sequence. Information insufficient in the course of the service is received from the user by a human interface part (7).

3 Claims, 4 Drawing Sheets

FIG. 4

| STEP NOS. | CONTENTS OF SEQUENCE PROCESSING |
| --- | --- |
| STEP 1 | START SERVICE. |
| . . . . . | |
| STEP m | INQUIRE ABOUT THE KIND OF GASOLINE TO BE REFUELED. (THE KIND SHOULD BE SELECTED BETWEEN "REGULAR" AND "HIGH OCTANE".) |
| STEP n | INQUIRE ABOUT THE AMOUNT OF GASOLINE TO BE REFUELED. (THE AMOUNT SHOULD BE "A FILL-UP" OR "A SPECIFIC VALUE") |
| . . . . . | |
| STEP END | PROCESSING IS COMPLETED. |

FIG. 5

| STEP NOS. | CONTENTS OF SEQUENCE PROCESSING |
| --- | --- |
| STEP 1 | START SERVICE. |
| . . . . . | |
| STEP m | INQUIRE ABOUT THE KIND OF GASOLINE TO BE REFUELED. (THE KIND SHOULD BE SELECTED BETWEEN "REGULAR" AND "HIGH OCTANE".) |
| STEP n | INQUIRE ABOUT THE AMOUNT OF GASOLINE TO BE REFUELED (THE AMOUNT SHOULD BE "A FILL-UP" OR "A SPECIFIC VALUE".) |
| . . . . . | |
| STEP s | ADVERTISE "HOT WATER CAR WASHING" AS A NEW SERVICE. (INQUIRE ABOUT CAR WASHING.) |
| . . . . . | |
| STEP END | PROCESSING IS COMPLETED. |

VEHICLE-ROADSIDE SERVICE PROVIDING SYSTEM

BACKGROUND OF THE INVENTION

1. Field of the Invention

The present invention relates to a service providing system for enabling the user of service client equipment installed on a vehicle to enjoy a plurality of services by sending and receiving information through DSRC (Dedicated Short Range Communications) between the on-board service client equipment and roadside service host equipment installed outside the vehicle. More particularly, it relates to a vehicle-roadside service providing system for enabling the user to enjoy, from the service host equipment, even services which are not accommodated by the service client equipment.

2. Description of the Related Art

Electronic toll collection (ETC) systems, which are a sort of conventional vehicle-roadside service providing system, have been put to practical use as one scheme of intelligent transport systems. In such ETC systems, drivers can pay the toll of a toll road without temporarily stopping their cars at a toll booth. In addition, ETC systems use the technology of dedicated short range communications (DSRC), and the achievement of various kinds of applications employing DSRC will be expected in the future.

In general, in DSRC, two-way communications at large capacity can be performed between roadside equipment and on-board or on-vehicle equipment in a narrow or limited zone (i.e., from a few meters to several tens of meters). For services using DSRC, it is desired to provide various kinds of services such as, for example, entry and exit management services in parking lots, refueling and payment services at gas stations, ordering and payment services in drive-throughs, etc.

Conventionally, a vehicle-roadside service providing system compatible with a variety of services has been proposed in which an application providing a service is set or installed in advance in an on-board DSRC device which can accommodate various kinds of services, in a manner such that the type of an application necessary for a specific service to be provided between the on-board device and roadside equipment is identified by the on-board device based on the identifier of the application, and only when the type of the application thus identified corresponds to that application which has been set in advance in the on-board device, the application is executed through communications between the on-board device and the roadside equipment thereby to start the specific service (see document 1: Japanese patent laid-open No. 2002-15342 for instance).

However, in case where it is necessary to register an application for a service in an on-board device in advance as described above, there arises the necessity of changing the content of registration of the on-board device in order to accommodate an application not yet registered therein.

For instance, a refueling and payment service at gas stations cannot be used by an on-board device in which only an entry and exit management service in parking lots is registered. In order to use the new service, it is necessary for the user to further register in the on-board device an application for executing the refueling and payment service.

Moreover, there has been proposed a DSRC system which is capable of achieving the provision of a service at gas stations for example when a certain application is executed by the use of DSRC (for instance, see document 2: Japanese patent laid-open No. 2001-213286).

Thus, in case where the DSRC system is constructed for gas stations, the kind and amount of fuel to be refueled are first told or notified by the user to a refueling system through DSRC, and subsequently, the refueling of fuel is automatically carried out based on the information given to the refueling system. Finally, payment for the refueling is performed by using an automatic settlement function through DSRC. When using such a service, the user also often uses a similar service repeatedly at a certain shop after having used the service at a different shop. At this time, even if the information (e.g., the kind and amount of fuel, etc.) that the user should pass on has the same content, it is necessary for the user to tell the information at each shop.

The conventional vehicle-roadside service providing systems, which have been constructed as mentioned above, involve the following problems. That is, in the case of document 1 above, an application for performing each service has to be reregistered every time an object for each service is changed such as between a service in parking lots and a service at gas stations, etc., for instance.

In addition, in the case of document 2 above, even if the user can enjoy a service at a plurality of gas stations, it is necessary for the user to pass on the same or similar information to each shop, which is troublesome and inconvenient.

SUMMARY OF THE INVENTION

The present invention is intended to obviate the above-mentioned problems, and has for its object to provide a vehicle-roadside service providing system which enables a user to enjoy even a service, which is not accommodated by on-board DSRC equipment installed on a vehicle, from roadside equipment, and which can easily accommodate a change in the content of the service.

Another object of the present invention is to provide a vehicle-roadside service providing system in which even if the place such as a shop, etc., where the user enjoys a service, changes, it is unnecessary for the user to notify information, if it can be omitted, which should be passed on from the user, to roadside equipment each time the user uses the same or similar service, thereby making it possible to improve user's convenience.

Bearing the above objects in mind, the present invention resides in a vehicle-roadside service providing system for providing a service to a user of service client equipment. The system includes: service host equipment arranged outside a vehicle; the service client equipment installed on the vehicle; and DSRC equipment for connecting between the service host equipment and the service client equipment for two-way communications. The service host equipment includes: a service sequence storage part for storing a service sequence that describes the procedure of the service; and a first sequence step executing part for executing the service sequence. The service client equipment includes: a service detecting part for detecting when the service is started; a human interface part for performing communications between the user and the service client equipment; a service sequence acquiring part for taking out the service sequence from the service host equipment through the DSRC equipment; and a second sequence step executing part for executing the service sequence.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 4 is an explanatory view showing one example of a service sequence according to the first embodiment of the present invention.

FIG. 5 is an explanatory view showing an example of adding a service sequence step according to a second embodiment of the present invention.

DESCRIPTION OF THE PREFERRED EMBODIMENTS

Now, preferred embodiments of the present invention will be described below in detail while referring to the accompanying drawings.

Embodiment 1

Figure 1:
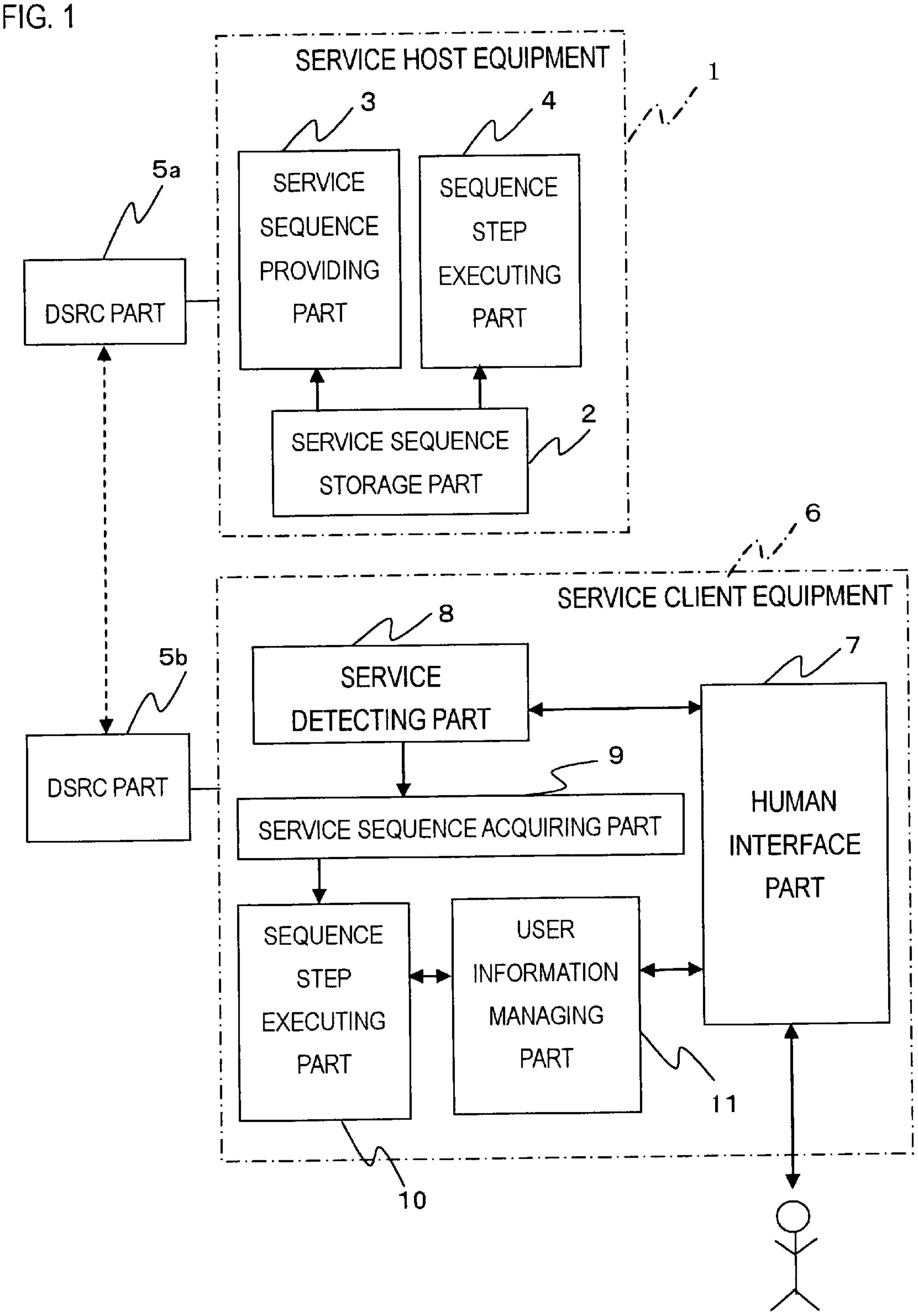
FIG. 1 is a block diagram showing a vehicle-roadside service providing system according to a first embodiment of the present invention.

FIG. 1 is a block diagram that shows a vehicle-roadside service providing system constructed according to a first embodiment of the present invention.

In FIG. 1, the vehicle-roadside service providing system illustrated includes service host equipment 1 and service client equipment 6. The service host equipment 1 is a roadside device which is arranged at a location outside a vehicle or car on a road or at a road side for providing a service. The service host equipment 1 is provided with a service sequence storage part 2, a service sequence providing part 3, and a sequence step executing part 4.

On the other hand, the service client equipment 6 is an on-board or on-vehicle equipment which is installed on a vehicle for using a service provided by the service host equipment 1. The service client equipment 6 is provided with a human interface part 7, a service detecting part 8, a service sequence acquiring part 9, a sequence step executing part 10, and a user information managing part 11.

The service host equipment 1 and the service client equipment 6 can be connected with each other for two-way communications through two pieces of DSRC equipment 5*a* and 5*b*. The DSRC equipment 5*a* and 5*b* are associated with the entire components inside the service host equipment 1 and the service client equipment 6, respectively.

The service sequence storage part 2 in the service host equipment 1 stores in advance a service sequence that describes the procedure of a service.

The service sequence providing part 3 provides the service client equipment 6 with the service sequence read out from the service sequence storage part 2 according to a request from the service client equipment 6.

The sequence step executing part 4 executes individual sequence steps each comprising a service procedure described in the service sequence stored in the service sequence storage part 2.

The human interface part 7 in the service client equipment 6 is associated with the service detecting part 8 and the user information managing part 11, and includes an interface such as an image display, a touch panel, a button switch, or a voice interactive interface, etc. The human interface part 7 is used when the service client equipment 6 communicates with the user.

The service detecting part 8 detects when the service client equipment 6 has entered a service providing area in which a service is provided by the service host equipment 1.

The service sequence acquiring part 9 actuates the sequence step executing part 10 in response to detection information from the service detecting part 8, so that a service sequence is requested from the service client equipment 6 to the service host equipment 1, and the service sequence sent from the service host equipment 1 is received by the service client equipment 6.

The sequence step executing part 10 executes individual service steps in the service client equipment 6.

The user information managing part 11 manages user information extracted from communications with the user in conjunction with the human interface part 7 and the sequence step executing part 10.

Now, the outline operation of the vehicle-roadside service providing system according to the first embodiment of the present invention as illustrated in FIG. 1 will be described while referring to a flow chart of FIG. 2.

Figure 2:
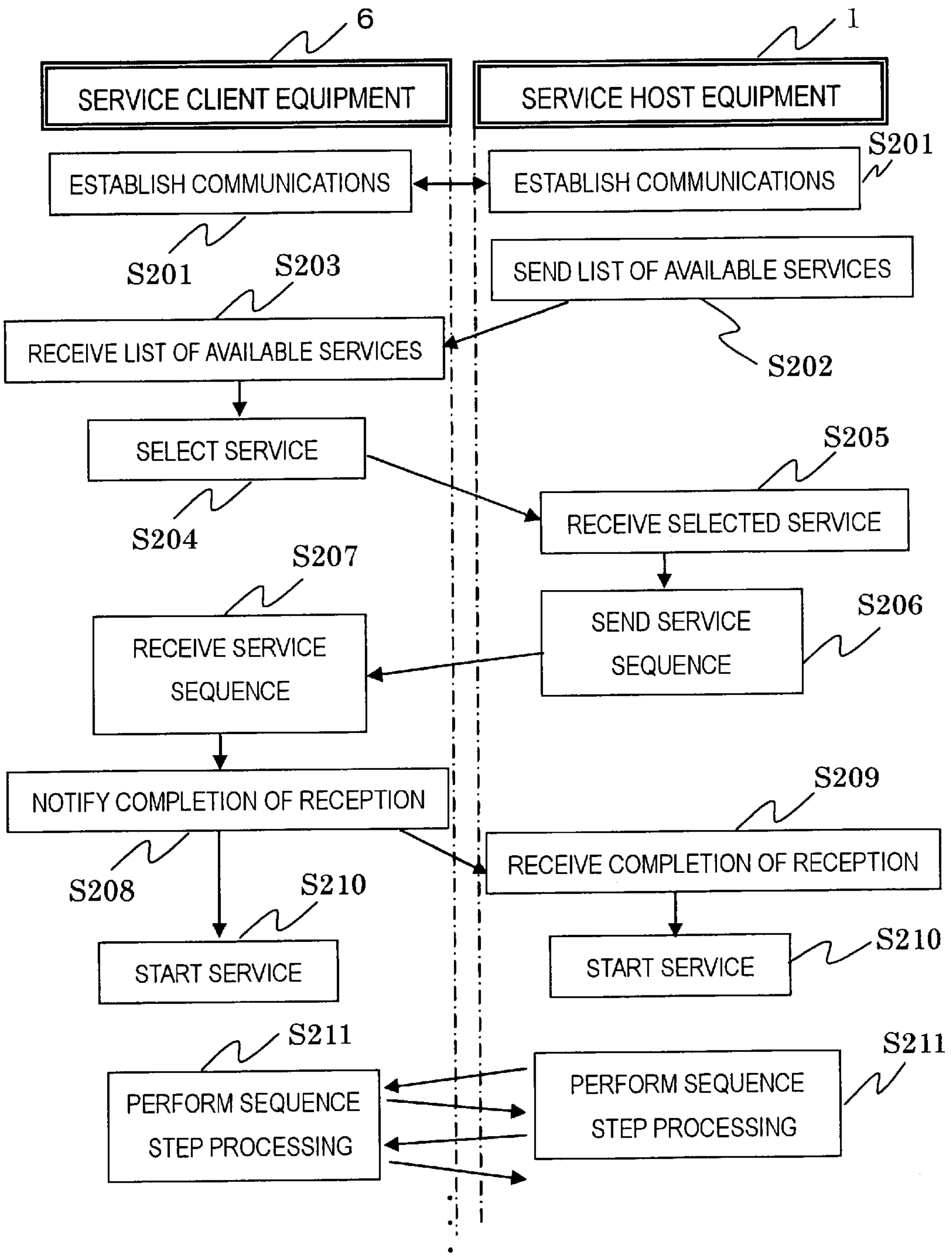
FIG. 2 is a flow chart showing the processing procedure of the vehicle-roadside service providing system up to the start of a service according to the first embodiment of the present invention.

FIG. 2 shows an operation sequence up to the start of a service using the service client equipment 6 and the service host equipment 1.

In FIG. 2, when the vehicle having the service client equipment 6 installed thereon first comes into the communication area or service providing area of the service host equipment 1, communications between the service client equipment 6 and the service host equipment 1 are established by means of a communication protocol of the DSRC equipment 5*a* and 5*b* (step S201).

Upon establishment of the communications, the service sequence providing part 3 in the service host equipment 1 reads from the service sequence storage part 2 a list of available services that can be provided by the service host equipment 1, and sends it to the service client equipment 6 (step S202).

The service client equipment 6 receives the list of available services from the service host equipment 1 (step S203). By referring to this list, the service detecting part 8 determines whether a service that the user wants to use is included in the service list. When the wanted service is included therein, the service is selected and a notification indicative of an intention of the user to use that service is returned to the service host equipment 1 (step S204).

Here, note that when in step S204, the user's intention is not fixed and the service wanted by the user is uncertain, the service detecting part 8 presents the user the list of services through the human interface part 7 so that the user can choose or select a service that he or she wants to use.

On the other hand, the service host equipment 1 receives from the service client equipment 6 the service wanted by the user (step S205). In response to this, the service sequence providing part 3 sends a service sequence describing the service procedure of the selected service to the service client equipment 6 through the DSRC parts 5*a* and 5*b* (step S206).

The service sequence acquiring part 9 in the service client equipment 6 receives the service sequence sent from the service host equipment 1 through the DSRC part 5*b* (step S207), and notifies the completion of reception to the service host equipment 1 when the reception of the entire service sequence has been completed (step S208).

Then, the service host equipment 1 receives the notification of reception completion from the service client equipment 6 (step S209). At this time, the service wanted and selected by the user is started between the service host equipment 1 and the service client equipment 6 (step S210).

Thereafter, communications through the DSRC equipment 5*a* and 5*c* are carried out between the service host equipment 1 and the service client equipment 6, whereby the respective sequence step executing parts 4, 10 in the service host equipment 1 and the service client equipment 6, respectively, perform service steps describing individual processing of the service sequence, thus accomplishing the processing of the service.

Now, the concrete operation of the service client equipment 6 after the start of the service will be described below while referring to a flow chart of FIG. 3 and an explanatory view of FIG. 4. Here, note that the service is carried out based on the service sequence, as previously stated.

FIG. 4 shows an example of the service sequence at a gas station. In FIG. 4, for the procedure of the service, processing necessary for the service from the start (Step 1) to the end (Step end) thereof is described as individual sequence steps. The service shown in FIG. 4 progresses by performing the respective sequence steps by means of the respective sequence step executing parts 4, 10.

Figure 3:
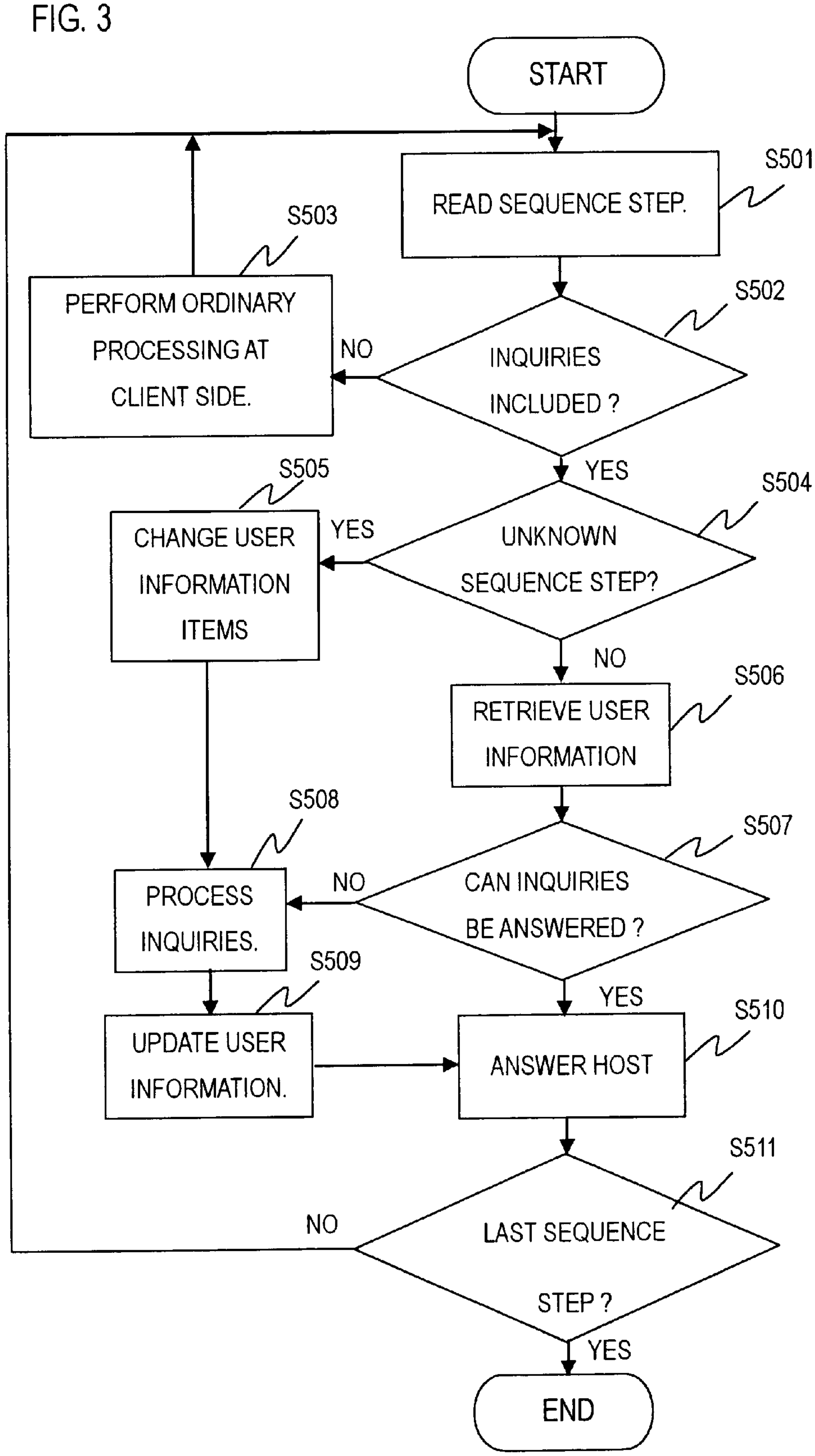
FIG. 3 is a flow chart showing the processing procedure of a sequence step executing part according to the first embodiment of the present invention.

In FIG. 3, the service client equipment 6 first reads the content of one sequence step from the acquired service sequence (step 501), and determines whether the sequence step thus read includes inquiries (step 502).

When it is determined in step S502 that no inquiry is included therein (that is, NO), the content of a specified sequence step is processed (step 503), and then the processing or control flow returns to step S501.

On the other hand, when determined in step 502 that the sequence step includes inquiries (that is, YES), then a further determination is made as to whether the sequence step including the inquiries is an unknown sequence step that has not yet been processed in the past (step 504).

When determined in step S504 that the current sequence step has not yet been processed in the past (that is, YES), the user information managing part 11 extracts items to be managed from the contents of the inquiries included in that sequence step, and updates a list of items that should be managed as user information (step 505), and then the control flow advances to inquiry processing (step 508).

On the other hand, when determined in step 504 that it is a sequence step processed in the past (that is, NO), answers to the inquiries included in the sequence step are retrieved from among user information that is managed by the user information managing part 11 (step 506).

Subsequently, the result of the retrieval performed in step 506 is analyzed, and it is determined whether the inquiries can be answered (step 507). When determined that the inquiries can not be answered (that is, NO), the inquiries included in the sequence step are asked to the user through the human interface part 7 (step 508). In addition, the user information managing part 11 updates, as user information management items, the inquiries to the user and the contents of answers thereto (step 509), and the processing or control flow proceeds to step S510.

On the other hand, when determined in step S507 that the inquiries can be answered (that is, YES), the processing or control flow proceeds to step 510 at once, where answers to the inquiries included in the sequence step are returned to the service host equipment 1.

Finally, it is determined whether the processing has advanced to the end of the sequence steps (step 511), and when determined that the processing has not yet advanced to the end (that is, NO), then a return to the processing of step 501 is performed. On the other hand, when determined that the processing has advanced to the end (that is, YES), the processing routine of FIG. 3 is ended.

Next, the progress of the service at the client side will be concretely explained while referring to FIG. 4. Here, it is assumed that in the service sequence (Step 1, . . . , m, n, . . . , end) shown in FIG. 4, the processing has advanced up to sequence step m for instance, and how to process the sequence step m according to the processing flow of FIG. 3 will be explained.

In the sequence step m, the content "Acquire the kind of gasoline from the user, and select the kind of gasoline from "high octane" and "regular"," is described as a request of the service host equipment 1. The sequence step executing part 10 executes an answer to this sequence step from the service client equipment 6 in accordance with the processing flow of FIG. 3.

That is, the processing has advanced to the user information retrieval processing (step 506), and then in step 506, the user information managing part 11 retrieves whether the kind of the gasoline that has been refueled by the user in the past is stored as a user information management item.

Here, if it was managed that the kind of gasoline was regular, the processing advances to the processing of answering the host (step 510), where the kind of gasoline is answered as "regular" to the service host equipment 1.

In the processing of the following sequence step n, the processing advances up to step 506 where the user information management items are retrieved as in the case of the above-mentioned sequence step m, but it is assumed here that the "amount" was not managed as a user information management item.

In this case, the inquiry processing (step 508) is executed, that is, an inquiry such as "How much gasoline do you need?" is made to the user through the human interface part 7.

When the user makes an answer of a "fill-up" through the human interface part 7, the content "The amount of gasoline to be refueled is a fill-up," is answered to the service host equipment 1 in step 510.

At this time, in the user information updating processing in step 509, pieces of information "The amount of gasoline to be refueled" and "Fill-up" are accumulated or stored by the user information managing part 11 as an item to be managed and as a user's answer to this item, respectively.

When refueling is completed based on the kind and amount of gasoline, information "refueled amount and charge" is communicated from the service host equipment 1 to the service client equipment 6, so that the service client equipment 6 passes on the information received to the user.

That is, in the case of the human interface part 7 provided with an image display part, the content of the received information from the service host equipment 1 is displayed, whereas in the case of the human interface part 7 having no image display part, the received information content is passed on to the user by voice.

In the last sequence step or step end, the payment of the charge for refueled gasoline is securely made by using a settlement mechanism through DSRC, thus completing the service sequence of FIG. 4.

In this manner, the service client equipment 6 acquires the service sequence stored in the service host equipment 1, and proceeds with the processing of the service based on the service sequence while communicating with the service host equipment 1.

In addition, the information accumulated by the user information managing part 11 is used at the times of the following and subsequent services. For instance, when using the following gasoline refueling service, the user can properly answer the service host equipment 1 only by answering an inquiry or confirmation "The gasoline to be refueled is regular, and the amount of fuel to be refueled is a fill-up. Are these all right?", which is asked from the service client equipment 6 to the user.

Since these information have been accumulated in the service client equipment 6, even if the shop providing the user with the service changes, it is possible for the user to enjoy the service as referred to above by utilizing the information managed by the user information managing part 11.

As described above, according to this embodiment, in a system for providing services to the user of the service client equipment 6 by sending and receiving information between the service host equipment 1 arranged at a road side and the service client equipment 6 installed on a vehicle through the DSRC equipment 5*a* and 5*b*, a service sequence describing the content of a service is stored in the service host equipment 1, and the service client equipment 6 acquires the service sequence from the service host equipment 1 by way of the DSRC equipment 5*a* and 5*b* at the time of execution of the service, so that the service sequence is sequentially or successively carried out by means of the sequence step executing parts 4, 10 while performing data transmission and reception through communications between the service host equipment 1 and the service client equipment 6 based on the service sequence. In this manner, even if the service is not compatible with or accommodated by the service client equipment 6, the user can enjoy the service from the service host equipment 1.

Moreover, information insufficient in the course of the service can be acquired from the user through the human interface part 7.

At this time, when the information to be given to the service host equipment 1 is asked to the user and then communicated to the service host equipment 1, the provision of the user information managing part 11 for storing and managing the information obtained from the user makes it possible to omit or simplify inquiries to the user if such inquiries can be answered by the use of the user information stored and managed by the user information managing part 11.

Although in the above explanation, how to provide a service has been described while taking as an example a gasoline refueling service at gas stations, even different kinds of services can be made available even with service client equipment not compatible with these services by preparing in advance a plurality of service sequences describing service contents corresponding to these services as illustrated in FIG. 4.

Embodiment 2

Though not particularly referred to in the above-mentioned first embodiment, the present invention can be applied, for instance, to the case where the content of a service at gas stations changes.

Hereinafter, reference will be made to a vehicle-roadside service providing system according to a second embodiment of the present invention in which the content of a service at gas stations is changed, while referring to an explanatory view of FIG. 5.

First of all, when a service provider wants to modify their service, it is necessary to change the service sequence for that service.

Here, let us take an example of a gasoline refueling service at gas stations, as in the above-mentioned first embodiment, in which the service sequence of the first embodiment is changed or modified in particular by adding a new sequence step (i.e., step s) which was not previously included therein.

For instance, let us consider the case in which a new car wash service using hot water is started at a certain gas station, and a guidance to such a new service is wanted to be added as part of the service sequence. In this case, the service sequence of FIG. 4 is modified into one as shown in FIG. 5.

In the service sequence of FIG. 5, an advertisement of a new service is inserted as a sequence step s after sequence step n in which the need of refueling and the amount of gasoline to be refueled are inquired to the user, and before the last sequence step or step end in which payment of the charge for refueling is completed.

In case where such sequence modification (addition) is carried out, the service host equipment 1 alone holds the service sequence that describes the content of the service, and hence it is not necessary to modify the service client equipment 6 at all so as to change the service sequence.

Also, in accordance with the addition of the service sequence step s of FIG. 5, the user information managing part 11 adds, as an item to be managed, an answer to an inquiry "Do you want a car wash service or not?" for instance in the user information management item changing process (step 505) in FIG. 3.

If it could be statistically analyzed by using such user information that it is customary for a certain user to use a car wash service once a month, for instance, it would be possible to give the user a guidance such as "Do you enjoy a car wash service since about one month has elapsed from the last car wash?", based on the result of this analysis.

Thus, even if the content of a service is changed, by properly modifying a related service sequence so as to accommodate such a change, or by properly managing, as user information, the inquiries and answers exchanged between the service host equipment 1 and the service client equipment 6, it is possible to reduce the users' load or trouble of answering inquiries and hence to improve users' convenience by utilizing those information.

As described in the foregoing, according to the present invention, a service sequence that describes the content of a service is provided in service host equipment, so that when a user uses the service, service client equipment is able to acquire the service sequence. Thus, there is obtained the following advantageous effect. That is, a vehicle-roadside service providing system can be provided which enables the user to enjoy even a service which is not accommodated in advance by the service client equipment.

While the invention has been described in terms of preferred embodiments, those skilled in the art will recognize that the invention can be practiced with modifications within the spirit and scope of the appended claims.

What is claimed is:

1. A vehicle-roadside service providing system for providing a service to a user of service client equipment, said system comprising:

service host equipment arranged outside a vehicle;

said service client equipment installed on the vehicle; and

DSRC equipment for connecting between said service host equipment and said service client equipment for two-way communications;

wherein said service host equipment comprises:

a service sequence storage part for storing a service sequence that describes the procedure of said service; and a first sequence step executing part for executing said service sequence;

and said service client equipment comprises:

a service detecting part for detecting when said service is started;

a human interface part for performing communications between said user and said service client equipment;

a service sequence acquiring part for taking out said service sequence from said service host equipment through said DSRC equipment; and a second sequence step executing part for executing said service sequence.

2. The vehicle-roadside service providing system as set forth in claim 1, wherein said service client equipment comprises a user information managing part, and said user information managing part extracts and maintains prescribed user information based on communications with the user through said human interface part.

3. The vehicle-roadside service providing system as set forth in claim 1, wherein the service sequence of said service sequence storage part is constructed such that it can be modified from outside.

* * * * *